United States Patent [19]

Czernakowski et al.

[11] Patent Number: 5,125,718
[45] Date of Patent: Jun. 30, 1992

[54] CHILD HARNESS IMPACT PAD

[75] Inventors: Waldemar Czernakowski, Blaustein; Hermann Wetter, Ulm, both of Fed. Rep. of Germany; Richard E. C. Marton, Ascot, England

[73] Assignees: Britax Romer Kindersicherheit GmbH, Fed. Rep. of Germany; Britax-Excelsior Limited, United Kingdom

[21] Appl. No.: 669,925

[22] Filed: Mar. 15, 1991

[30] Foreign Application Priority Data

Mar. 16, 1990 [GB] United Kingdom ............... 9005998

[51] Int. Cl.⁵ .............................................. B60R 22/14
[52] U.S. Cl. .................................. 297/484; 297/468; 297/487; 24/630; 24/633
[58] Field of Search ............... 297/465, 468, 485, 487, 297/488; 24/573.6, 630, 632, 633, 702

[56] References Cited

U.S. PATENT DOCUMENTS

| 2,817,393 | 12/1957 | Mitchell | 297/484 X |
| 3,321,247 | 5/1967 | Dillender | 297/465 |
| 4,540,218 | 9/1985 | Thomas | 24/633 X |

Primary Examiner—Peter R. Brown
Attorney, Agent, or Firm—Davis, Bujold & Streck

[57] ABSTRACT

A child safety harness has a pair of lap straps and a pair of shoulder straps interconnected by an impact pad which comprises an upper portion and a lower portion. Coupling means connects the upper portion to the lower portion in a plurality of alternative mutually overlapping positions so as to vary the distance between the upper edge of the upper portion and the lower edge of the lower portion.

15 Claims, 4 Drawing Sheets

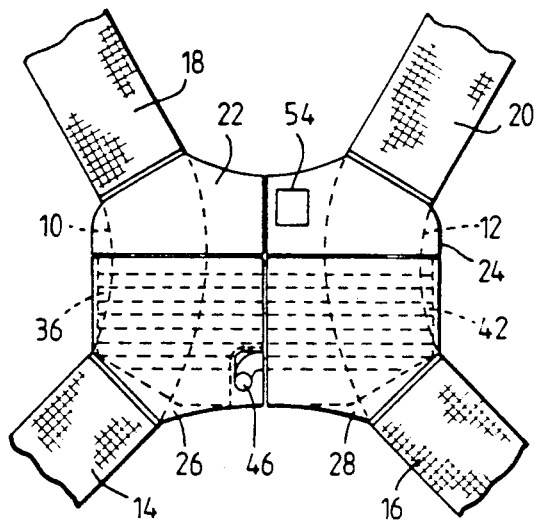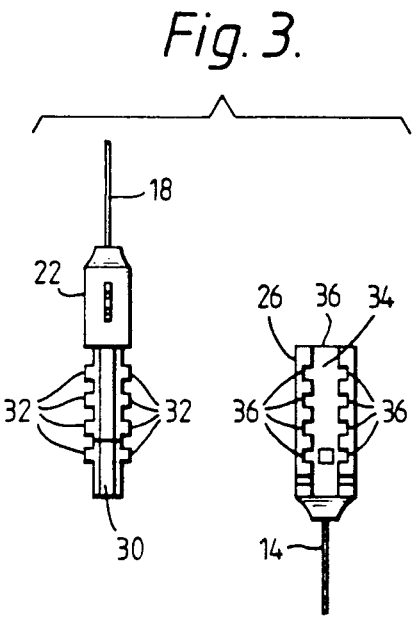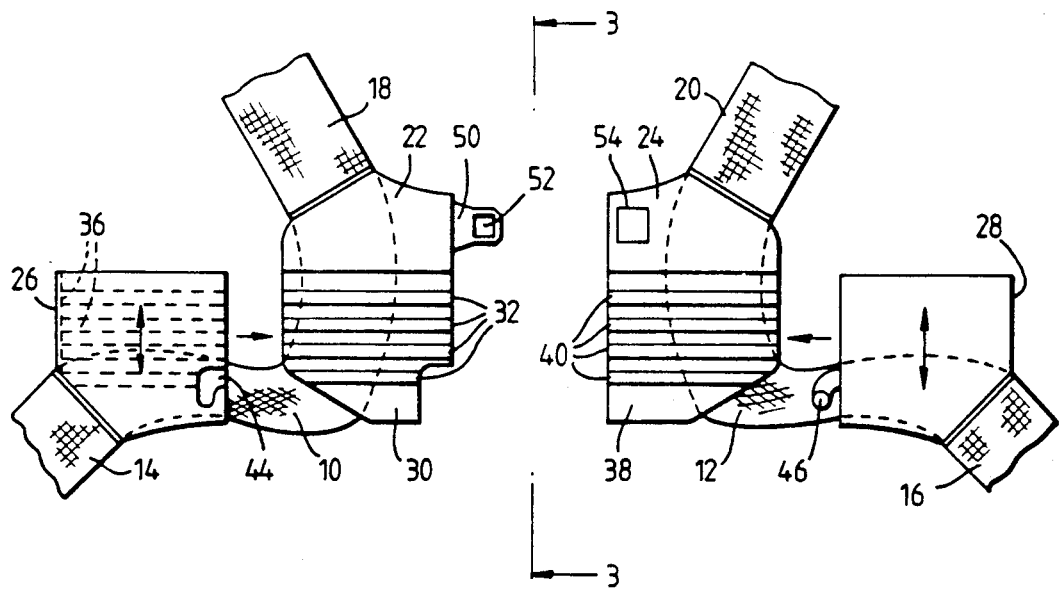

CHILD HARNESS IMPACT PAD

FIELD OF THE INVENTION

This invention relates to a child safety harness having a pair of lap straps and a pair of shoulder straps interconnected by an impact pad.

RELATED ART

It is already known to provide a child safety harness with an impact pad which is located between the junction between the various straps of the harness and the child's body. Ideally, such an impact pad extends from a location close to the thighs of the user to a location approximately half way up the user's breast bone. The present invention aims to provide an impact pad of adjustable height so that this ideal configuration can be maintained as the child grows.

SUMMARY OF THE INVENTION

According to the invention, a harness of the type described above comprises an upper portion and a lower portion, and coupling means connecting the upper portion to the lower portion in a plurality of alternative mutually overlapping positions so as to vary the distance between the upper edge of the upper portion and the lower edge of the lower portion.

The upper and lower portions of the impact pad may each be formed in two side parts, the side parts of the upper portion having a first set of mutually interengaging latching formations and the side parts of the upper portion having a second set of mutually interengaging latching formations. Preferably, the first and second sets of latching formations are so positioned that both sets of latching formations can interengage simultaneously only if the parts on one side of the pad are set to the same height as the parts on the other side of the pad.

In one form of the invention, the coupling means comprises a tongue integral with one of said portions, the tongue projecting into a transverse slot in the other portion, at least one of the side walls of the tongue and the corresponding wall of the slot having horizontally extending mutually interengaging ribs and grooves, permitting the two portions to be separated from one another by sliding one portion laterally with respect to the other while preventing separation by relative vertical movement.

In use, the two halves may be fitted together with their ribs and grooves interengaging in a series of alternative positions so as to vary the overall height of the impact pad.

Alternatively, the coupling means is arranged to vary the distance between the upper edge of the upper portion and the lower edge of the lower portion over a continuous range.

BRIEF DESCRIPTION OF THE DRAWINGS

FIG. 1 is a front view of a four-part impact pad in accordance with a first embodiment of the invention assembled so as to have minimum height;

FIG. 2 is a front view of the impact pad shown in FIG. 1 with all four parts separated from one another;

FIG. 3 is a view taken on the line 3—3 in FIG. 2;

DETAILED DESCRIPTION OF PREFERRED EMBODIMENTS

Figure 4:
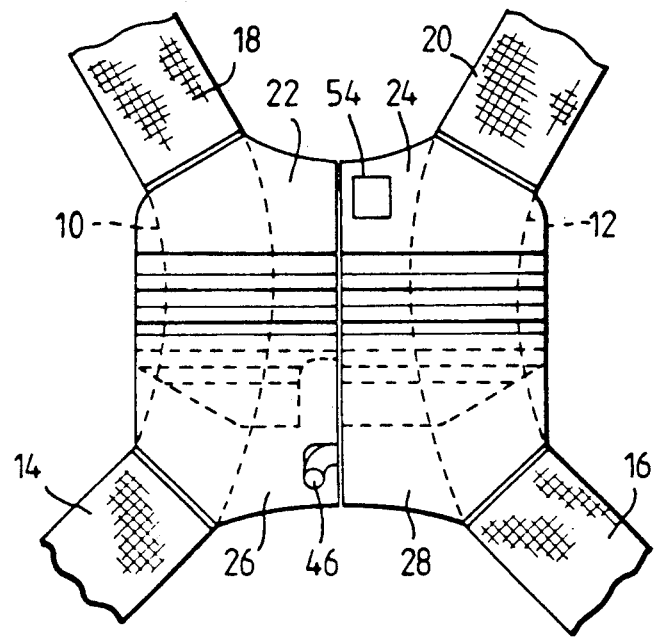
FIG. 4 is a front view, similar to FIG. 1, but showing the impact pad at its maximum height.

Referring to FIGS. 1 to 5, a safety harness, for use in a motor vehicle, has a pair of belts 10 and 12, the lower ends of which form respective lap straps 14 and 16 and the upper ends of which form respective shoulder straps 18 and 20. The two belts 10 and 12 are freely slidable through and are inter-connected by a combined impact pad and buckle in accordance with the invention. The combined impact pad and buckle is in four buckle parts, with the shoulder strap 18 projecting from a first upper part 22, the shoulder strap 20 projecting from a second upper part 24, the lap strap 14 projecting from a first lower part 26 and the lap strap 16 projecting from a second lower part 28.

As can best be seen from FIG. 3, the first upper part 22 has a downwardly projecting tongue 30 with four parallel ribs 32 on each of its side faces. The first lower part 26 has a transverse slot 34 with a respective groove 36 in each of its side walls corresponding to each of the ribs 32. The outer end of the slot 34 is closed by an end wall 36 (see also FIG. 2). Similarly, the second upper buckle part 24 has a downwardly extending tongue 38 with ribs 40 which engage in grooves 42 in a transverse slot in the second lower buckle part 28.

The tongues 30, 38 of each of the upper buckle parts 22 and 24 can be slotted into the corresponding lower buckle parts at any of four alternative heights. All of the ribs 32, 40 may engage in grooves 36, 42 in the lower buckle parts 26, 28. Only the lowermost of the ribs 32, 40 may engage in the uppermost groove 36, 42 as illustrated in FIG. 4. Alternatively, the various parts can be assembled at either of two intermediate positions between these two extremes with two or three of the ribs 32, 40 engaging in grooves 36, 42.

In order to hold the two sides of the combined buckle and impact pad together in use, the first lower buckle part 26 has an L-shaped recess 44 for receiving a hook-like formation 46 on the second lower buckle part 28. The first upper buckle part 22 has a laterally projecting tongue 50 having an aperture 52 which is engageable by a latch mechanism (not shown) in the second upper buckle part 24 and which can be released by depressing a push button 54. Latch mechanisms suitable for engagement with the tongue 50 are well known and do not form part of the present invention.

Figure 5:
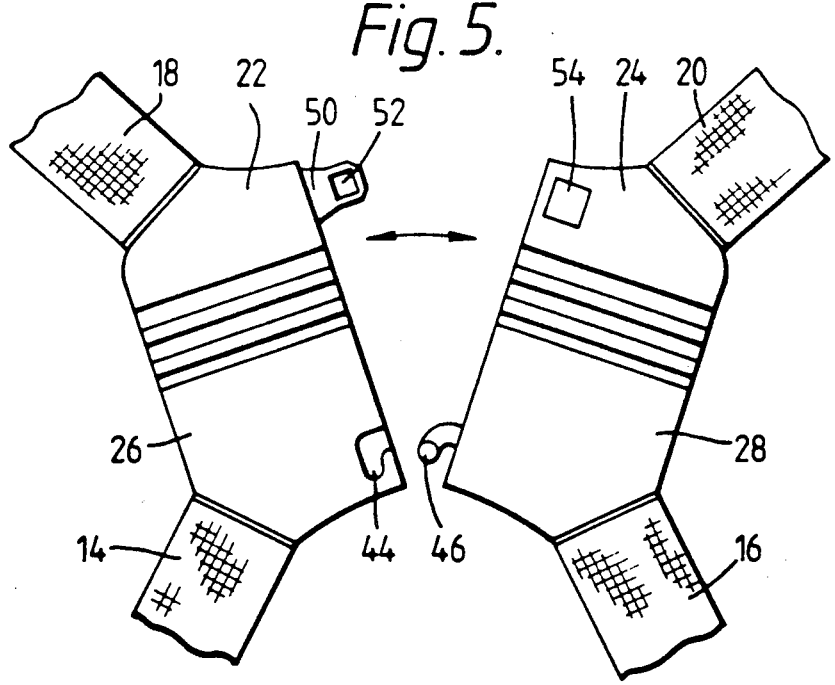
FIG. 5 is a front view showing the impact pad illustrated in FIG. 1 just before engagement of the two sets of latching formations.

When the buckle is to be fastened, the upper and lower parts on each side are first slotted together at the required height, as illustrated in FIG. 5 and the hook formation 46 engaged in the recess 44. The two sides are then pivoted together about the hook formation 46 to bring the tongue 50 into engagement with the latch mechanism associated with the push button 54. It will be appreciated that the tongue 50 cannot be brought into engagement with this latch mechanism unless the upper and lower parts of both sides of the impact pad are assembled together at the same height.

Figure 6:
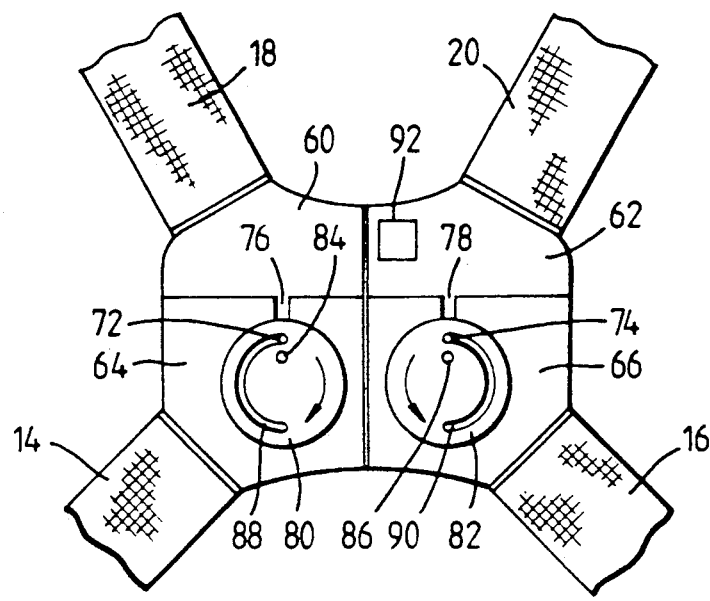
FIG. 6 is a front view, similar to FIG. 1, of a second embodiment of the invention.
Figure 7:
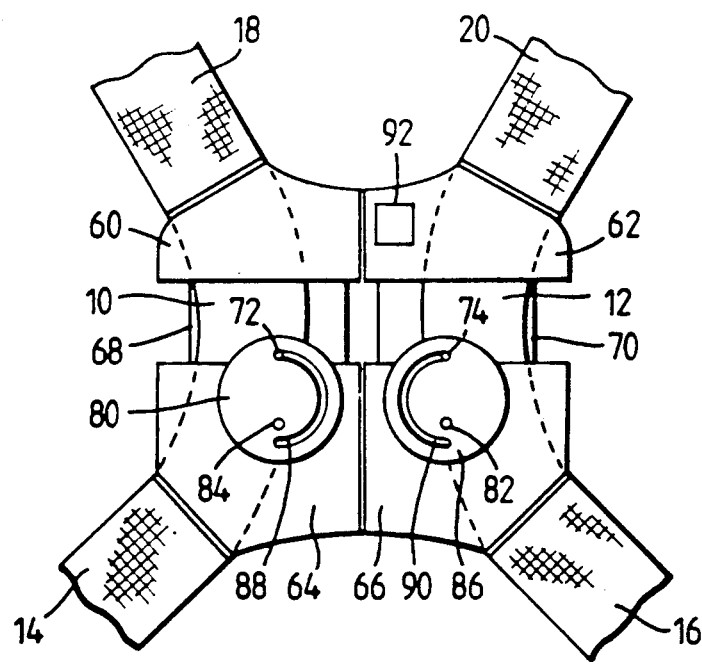
FIG. 7 is a front view, similar to FIG. 4, of the embodiment shown in FIG. 6.

FIGS. 6 and 7 illustrate another embodiment of the invention in which the two belts 10 and 12 are interconnected by a combined impact pad and buckle comprising first and second upper parts 60 and 62 and first and second lower parts 64 and 66. The belt 10 runs freely through the first upper part 60 and the first lower parts 64. The belt 12 runs freely through the second upper part 62 and the second lower part 66. The two upper parts 60 and 62 have respective tongues 68 and 70 which project into respective slots in the lower parts 64 and 66. The tongues 68 and 70 carry respective pegs 72 and 74 which are received in respective slots 76 and 78 in the front faces of the lower parts 64 and 66 when the combined buckle and pad is at its minimum height, as illustrated in FIG. 6.

Respective control knobs 80 and 82 are eccentrically journalled on pivot pins 84 and 86 which are secured to the front surfaces of the lower parts 64 and 66 below the lower ends of the slots 76 and 78. The pins 72 and 74 project into semicircular arcuate slots 88 and 90 in the discs 84 and 86. Angular movement of the discs 80 and 82 through 180 causes the upper parts 60 and 62 to move relative to the lower parts 64 and 66 between the positions shown in FIG. 6 and the position shown in FIG. 7.

The upper part 62 carries a latch of which the push button 92 is visible in FIGS. 6 and 7. This latch engages with a tongue (not shown) similar to the tongue 50 shown in FIGS. 2 and 5. The two lower parts 64 and 66 have interengaging hook formations, similar to the hook formations 44 and 46 described above.

Figure 8:
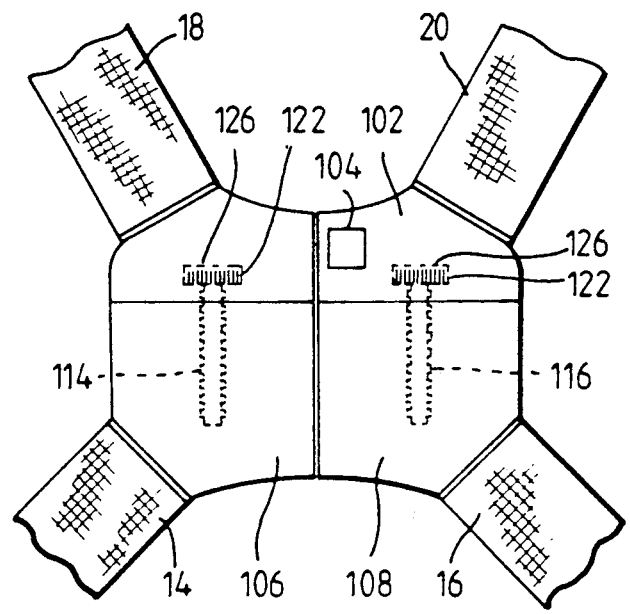
FIG. 8 is a front view, similar to FIG. 1, of a third embodiment of the invention.
Figure 9:
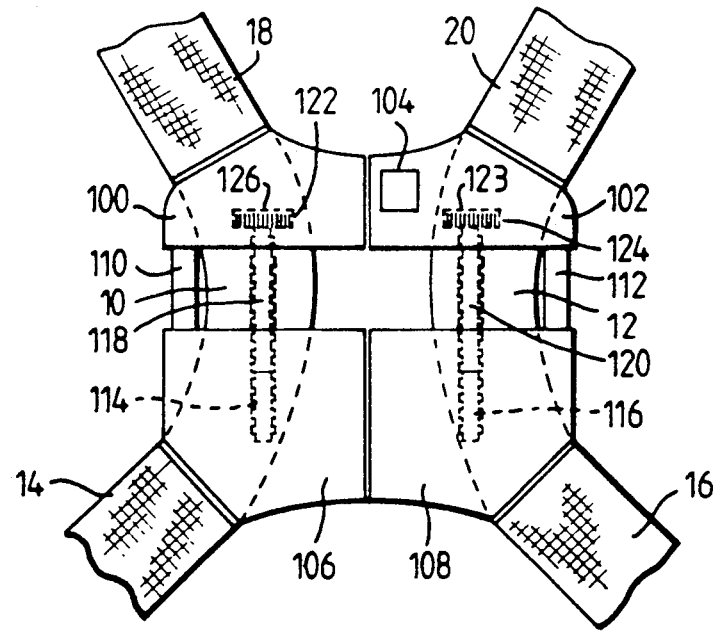
FIG. 9 is a front view, similar to FIG. 4, of the embodiment shown in FIG. 8.

FIGS. 8 and 9 illustrate a further embodiment of the invention in which the impact pad has first and second upper parts 100 and 102, the latter having a push button 104 of a latch for inter-connecting these two upper parts. The impact pad also comprises first and second lower parts 106 and 108 which are inter-connected by hook formations (now shown) similar to the hook formations 44 and 46 described above. The two belts 10 and 12 slide through respective upper and lower parts in a similar manner to that described above.

The upper parts 100 and 102 have respective slide guides 110 and 112 which project into respective holes in the lower parts 106 and 108. The lower parts 106 and 108 also have respective tapped holes 114 and 116 into which threaded rods 118 and 120 are screwed. The rods 118 and 120 have thumb wheels 122 and 124 fast with their upper ends accommodated in respective recesses 126 and 128 in the upper parts 100 and 102. Rotation of the thumb wheels 122 and 124 enables the impact pad to be adjusted between the configuration illustrated in FIG. 8 and the configuration illustrated in FIG. 9, the rods 118 and 120 serving as screw-jacks.

We claim:

1. A child safety harness having a pair of lap straps, a pair of shoulder straps and an impact pad interconnecting the lap straps and the shoulder straps, wherein the impact pad comprises an upper portion and a lower portion and coupling means connecting the upper portion to the lower portion in a plurality of alternative mutually overlapping positions so as to vary the distance between the upper edge of the upper portion and the lower edge of the lower portion.

2. A harness according to claim 1, wherein the upper portion comprises a first upper side part and a second upper side part interconnected by first set of mutually interengaging latching formations and the lower portion comprises a first lower side part and a second lower side part interconnected by a second set of mutually interengaging latching formations.

3. A harness according to claim 2, wherein the coupling means comprises a tongue integral with one of said portions, the tongue projecting into a transverse slot in the other portion, at least one of the side walls of the tongue and the corresponding wall of the slot having horizontally extending mutually interengaging ribs and grooves, permitting the two portions to be separated from one another by sliding one portion laterally with respect to the other while preventing separation by relative vertical movement.

4. A harness according to claim 2, wherein the coupling means is arranged to vary the distance between the upper edge of the upper portion and the lower edge of the lower portion over a continuous range.

5. A harness according to claim 4, wherein the coupling means comprises rotary camming means on one of the upper and lower portions and cam follower means on the other of the upper and lower portions.

6. A harness according to claim 4, wherein the coupling means comprises screw-jack means.

7. A harness according to claim 2, wherein the first and second sets of latching formations are so positioned that both sets of latching formations can interengage simultaneously only if the parts on one side of the pad are set to the same height as the parts on the other side of the pad.

8. A harness according to claim 7, wherein the coupling means comprises a tongue integral with one of said portions, the tongue projecting into a transverse slot in the other portion, at least one of the side walls of the tongue and the corresponding wall of the slot having horizontally extending mutually interengaging ribs and grooves, permitting the two portions to be separated from one another by sliding one portion laterally with respect to the other while preventing separation by relative vertical movement.

9. A harness according to claim 7, wherein the coupling means is arranged to vary the distance between the upper edge of the upper portion and the lower edge of the lower portion over a continuous range.

10. A harness according to claim 9, wherein coupling means comprises rotary camming means on one of the upper and lower portions and cam follower means on the other of the upper and lower portions.

11. A harness according to claim 9, wherein the coupling means comprises screw-jack means.

12. A harness according to claim 1, wherein the coupling means comprises a tongue integral with one of said portions, the tongue projecting into a transverse slot in the other portion, at least one of the side walls of the tongue and the corresponding wall of the slot having horizontally extending mutually interengaging ribs and grooves, permitting the two portions to be separated from one another by sliding one portion laterally with respect to the other while preventing separation by relative vertical movement.

13. A harness according to claim 1, wherein the coupling means is arranged to vary the distance between the upper edge of the upper portion and the lower edge of the lower portion over a continuous range.

14. A harness according to claim 13, wherein the coupling means comprises rotary camming means on one of the upper and lower portions and cam follower means on the other of the upper and lower portions.

15. A harness according to claim 13, wherein the coupling means comprises screw-jack means.

* * * * *